United States Patent [19]

Chalasani et al.

[11] Patent Number: 5,565,283
[45] Date of Patent: Oct. 15, 1996

[54] BATTERY HANDLE

[75] Inventors: Subhas C. B. Chalasani, Plano; Roy Kuipers, Rockwall; Michael C. Steeves, Garland, all of Tex.

[73] Assignee: Lucent Technologies Inc., Murray Hill, N.J.

[21] Appl. No.: 445,322

[22] Filed: May 19, 1995

[51] Int. Cl.⁶ .................................................. H01M 2/10
[52] U.S. Cl. .................................... 429/187; 16/DIG. 15; 294/903; 294/158
[58] Field of Search ...................... 429/187; 16/DIG. 15, 16/125; 294/156, 158, 903; 190/115

[56] References Cited

U.S. PATENT DOCUMENTS

| | | | |
|---|---|---|---|
| 3,092,520 | 6/1963 | Buskirk et al. | 429/187 |
| 4,374,188 | 2/1983 | Campbell et al. | 429/187 |
| 5,372,899 | 12/1994 | Kuipers et al. | 429/187 |

OTHER PUBLICATIONS

"High Technology Fibers" Part A—Handbook of Fiber Science and Technology/vol. III, Scruggs & Reed, Publisher: Marcel Dekker, Inc., 1985, pp. 335–347.

"Properties and Performance", Ryton, Phillips Fibers Corporation/Oct. 1989, pp. 1–6, 69–70.

Primary Examiner—Anthony Skapars
Attorney, Agent, or Firm—Alfred G. Steinmetz

[57] ABSTRACT

In a battery handle two bands of webbed material are each arranged and threaded to independently engage a plurality of slots at opposing ends of a support housing in which a battery is enclosed. Each end includes six slots arranged in pairs of slots. The longitudinal/major axis of the two uppermost slots are at an angle to the horizontal and the major axis of the remaining four slob are substantially horizontal. In another aspect, the band of webbed material is threaded through two or more slots and the ends are joined together. Another technique loops the ends and expands the loop with a mechanical insert to lock it to the support housing.

Many variations of the invention will be readily apparent to those skilled in the art which do not depart form the spirit and scope of the invention.

9 Claims, 7 Drawing Sheets

BATTERY HANDLE

FIELD OF THE INVENTION

This invention relates to the transport of heavy batteries and in particular to a handhold mechanism for facilitating such transport.

BACKGROUND OF THE INVENTION

The transport of heavy batteries is at best a necessary inconvenience. The weight necessitates the use of hand grips or handles, but such hand grips or handles become an inconvenience once the battery is in its position of use. Either the handle is removable and subject to loss or distant placement or it consumes physical space in the environment of use of the battery.

In a prior art arrangement disclosed in U.S. Pat. No. 5,372,899, a battery support housing is provided to enclose a substantial portion of the battery's outer casing. The housing includes three pairs of arrayed slob in each of two opposing sides. A ribbon or band of webbed material is continuously threaded through all the slots, in the two ends of the housing, with a sufficient slack in the band of webbed material between the upper pairs of slob at the two opposing ends to allow a hand grip of the band of webbed material. The ends of the band of webbed material are secured to the housing by circularly threading the terminal ends of the band of webbed material continuously through adjacent slob in each of the two opposing sides of the housing and in a terminal end slot in each side by at least two turns.

SUMMARY OF THE INVENTION

In accord with the invention, a battery transport handle is provided as claimed in claim 1.

In a battery handle two bands of webbed material are each arranged and threaded to independently engage a plurality of slob at opposing ends of a support housing in which a battery is enclosed. Each end, in one illustrative embodiment, includes six slots arranged in pairs of slots. The longitudinal/major axis of the two uppermost oblong slob are positioned at an angle to the horizontal and the major axis of the remaining four slob are positioned substantially horizontal.

In another illustrative embodiment, a band of webbed material is looped through two angled slob near the top edge in the opposing ends of the housing. The webbed band loop is completed by joining the two ends of the band between the angled slob in the interior of the housing. Joining of the two ends of the loop may be by sewing or by ultrasonic banding or by a combination thereof.

In another illustrative aspect, the two slob instead of being oblong are circular in periphery.

In yet another aspect, a webbed band has its two ends each terminated in a loop. The loop is collapsed for insertion into apertures in the housing and each end is secured in a bottom aperture by using a retainer member to expand the loop beyond a dimension of the aperture.

DETAILED DESCRIPTION

Figure 1:
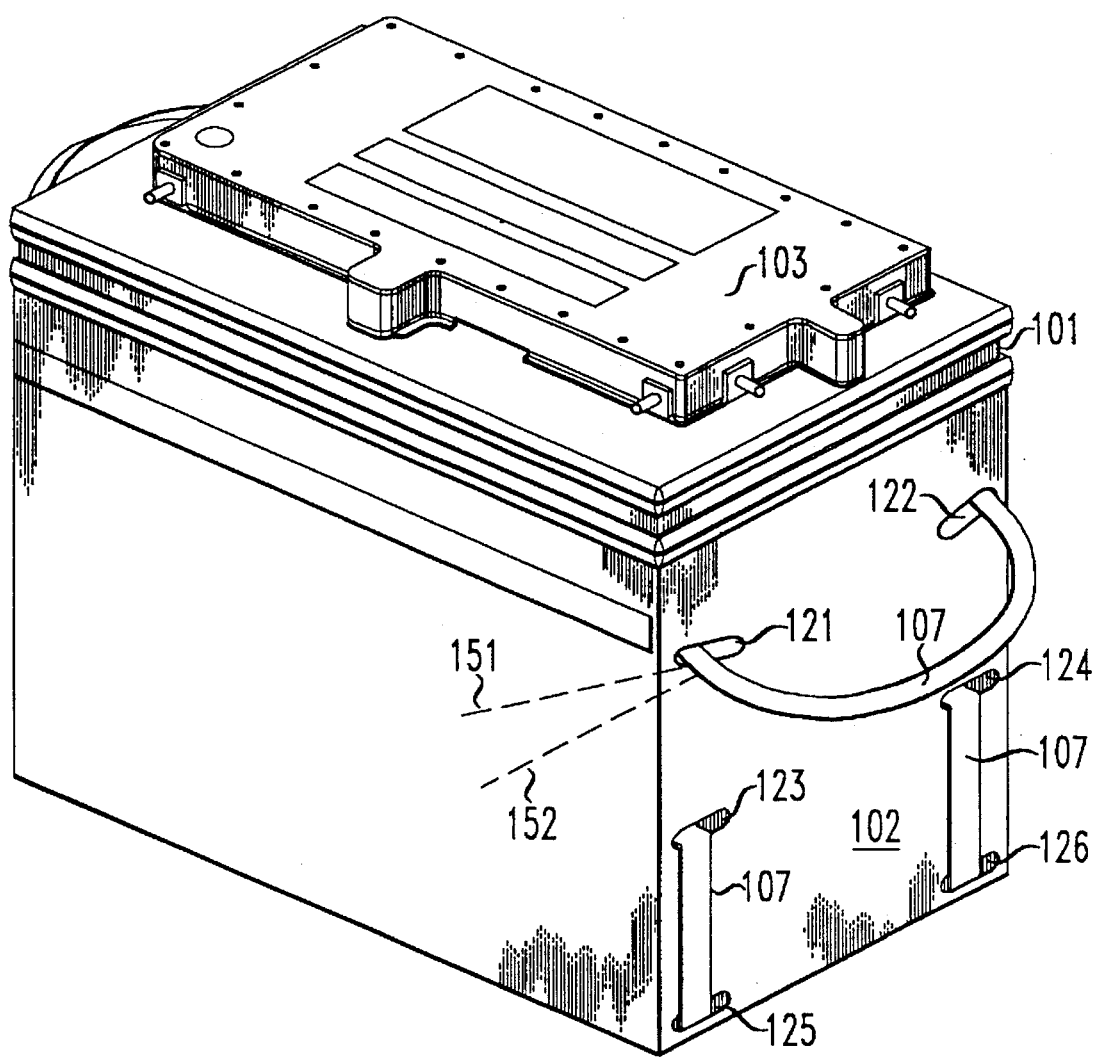
FIG. 1 is a pictorial view of an illustrative battery assembly with a ribbon handle for transport and oblong slots in a battery container or housing for exiting the handle portion of the ribbon.

A battery 101, having a substantially parallelepiped shape, is shown included in a battery support housing 102 in FIG. 1. The top surface 103 of the battery 101 is exposed so that the electrical terminals thereon are exposed for cable attachment. A ribbon or band of webbed material 107 is shown interleaved through slots 121 to 126 included in one end of the battery support housing 101 (the ribbon or band of the opposing end is not visible in FIG. 1). The interweave of the band of webbed,material 107 is taut with the exception of the portion of webbed material threaded between the slots 121 and 122 of the one side 131. A similar arrangement is threaded through corresponding slots in the opposing side. The slack portion of the band of webbed material provides a handhold which in combination with a hand hold provided at the opposite end of the support housing enables the transport of the battery 101, which is enclosed in the battery support housing 102.

In the exploded assembly view of FIG. 2 the battery support housing 102 is shown located below the battery 101 itself. The handle ribbon or band is not shown in FIG. 2 but is to be threaded through the slots 121 to 126. Battery 101 is shown positioned above the support housing before insertion therein. The fit is snug to secure the ribbon or band of material forming the handle within the slots in which they are threaded.

Figure 2:
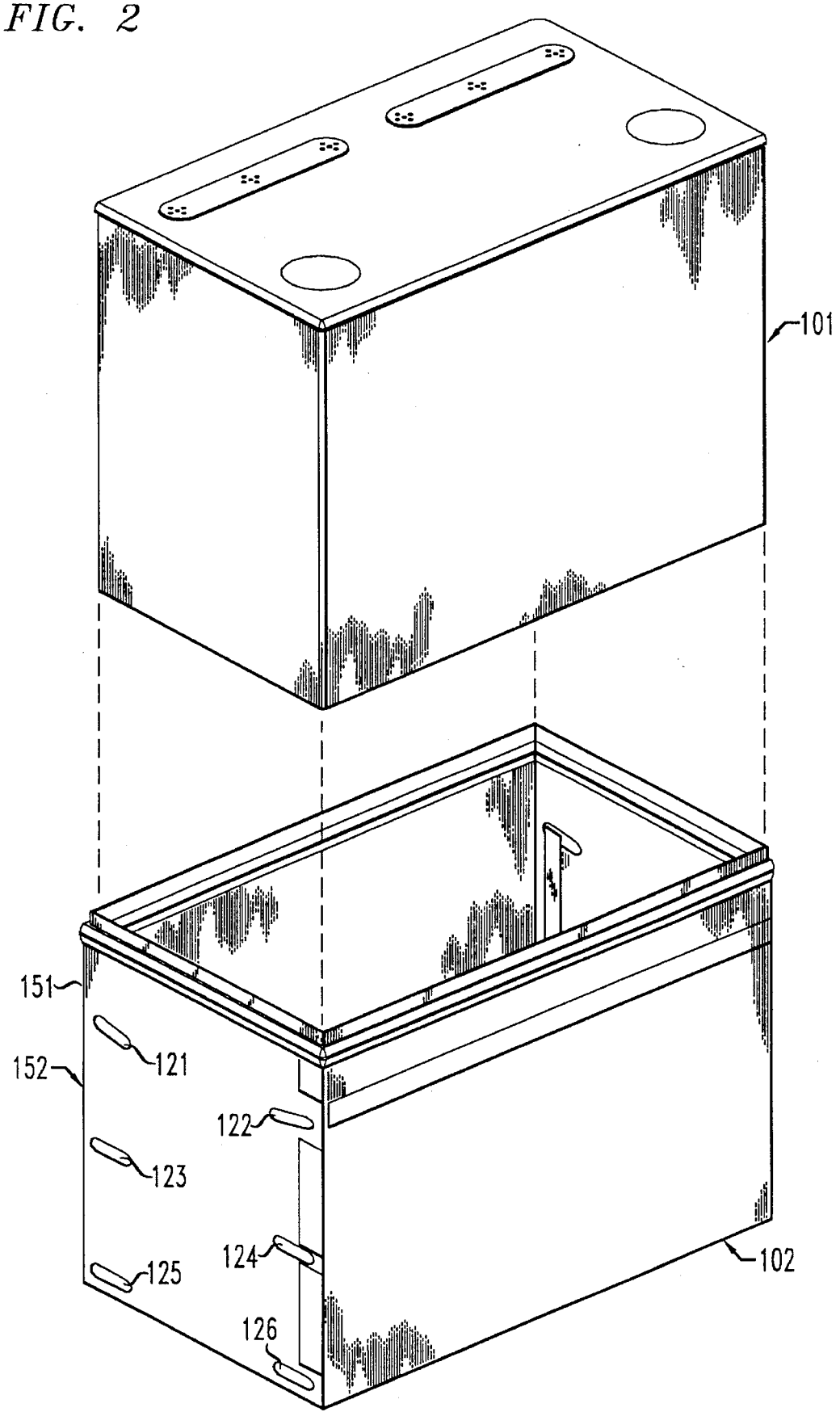
FIG. 2 is an exploded schematic view of the illustrative battery and housing assembly of FIG. 1.
Figure 3:
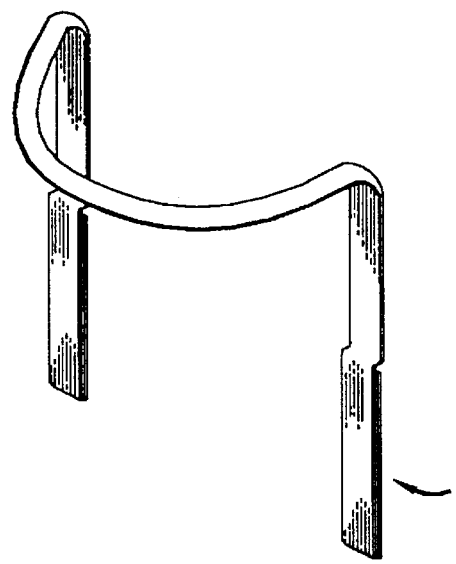
FIG. 3 is a tree standing illustrative view of the handle ribbon used in FIG. 1 for battery transport.

As shown in both FIGS. 1 and 2 the top slots 121 and 122 each have an oblong perimeter shape with a longitudinal axis 15 1 of the oblong shape being tilted with respect to the horizontal 152. The slob 123, 124, 125 and 126 all have oblong perimeter shapes with the longitudinal axis parallel to the horizontal.

Figure 4:
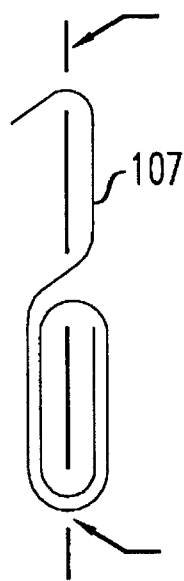
FIG. 4 is a cross section of the threading of the ribbon handle of FIG. 3 in the end of the support housing.

The ribbon or band of webbed material is shown in a stand alone projection in the FIG. 4, as it would appear when threaded through the slob of the housing. As shown, in FIG. 1, the top portion of the webbed material passes through the top slots 121 and 122 and passes inside the housing to be threaded or looped around the housing passing through the two lower slob on each side of the housing end wall. A cross section of this routing or looping through three slots on one side of the one end wall is shown in the FIG. 4. One end of the webbed material 107 is looped twice about the lower two slob and passes through the top slot front from the interior to the out side of the housing. The webbed material is continued to be threaded in the same manner in the slob in the opposing end wall of the housing.

The material used in the illustrative embodiment, for the webbed band 107, is made of RYTON™ (Poly Phenylene Sulfide) material. This material has significant tensile strength, very low electrical conductivity, and high resistance to flame which meets or exceeds the requirements of UL94V-O and high resistance to acid at elevated temperature. This material is advantageously resistant or inert with respect to sulfuric acid which is a major consideration in a battery transport handle. Other materials of similar strength, electrical and durability characteristics may be used for this application. Other constructions of the band, such as an extruded ribbon, not comprising webbed material may be used as the band to supply the hand grip.

It is critical that the webbing of the band not unravel. Accordingly, a herringbone weave of RYTON™ material is used in the illustrative embodiment which has excellent resistance to unraveling.

Figure 5:
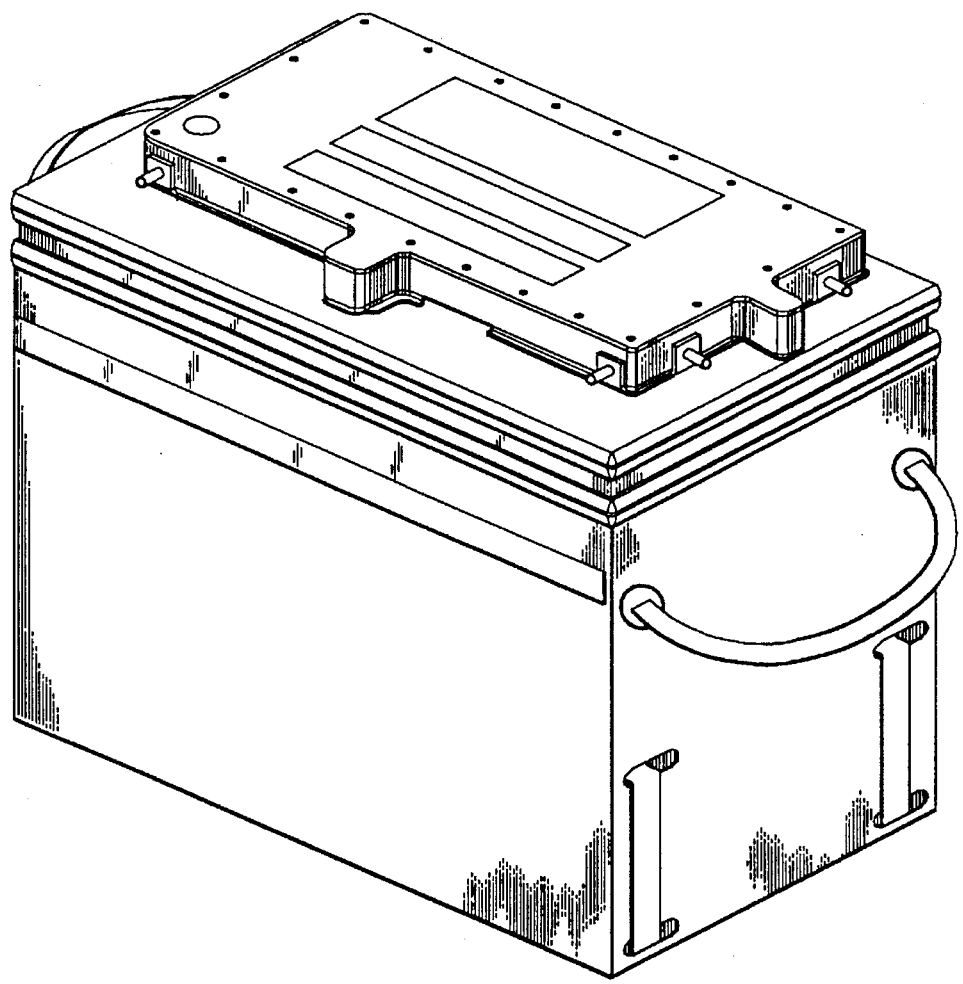
FIG. 5 and 6 are pictorial and end view schematics respectively of another illustrative scheme of attaching a webbed handle to the support housing.
Figure 6:
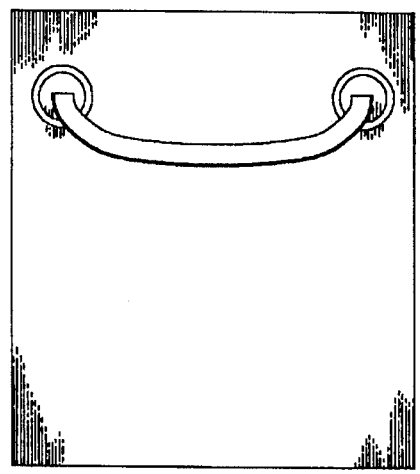

An alternative arrangement is shown in the FIG. 5 schematic in which the webbed handle is threaded through circular slots 521 and 522. An end view is shown in the FIG. 6. In this illustrative arrangement only two slots are used with the two ends of the webbed ribbon handle being joined together within the support housing by a stitch or welding of the two ends together. The circular slots prevent cutting and fraying of the webbed ribbon as it passes through the slots. Such connection of the two ends of the webbed ribbon may be used in other multislot arrangements such as shown in FIG. 1.

Figure 7:
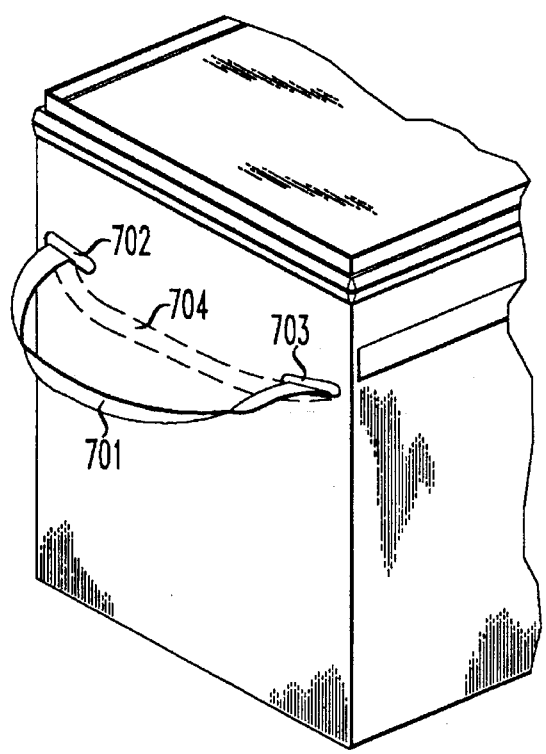
FIGS. 7 and 8 are a pictorial schematics of added schemes of attaching a webbed handle to the support housing.

The handle structure of FIG. 7, for example, comprises a webbed band 701 which is threaded through oblong or elongated slots 702 and 703 and has its ends joined at join 704 which is located interior to the support housing. Joining may be by sewing construction, ultrasonic bonding, or by both in combination.

Figure 8:
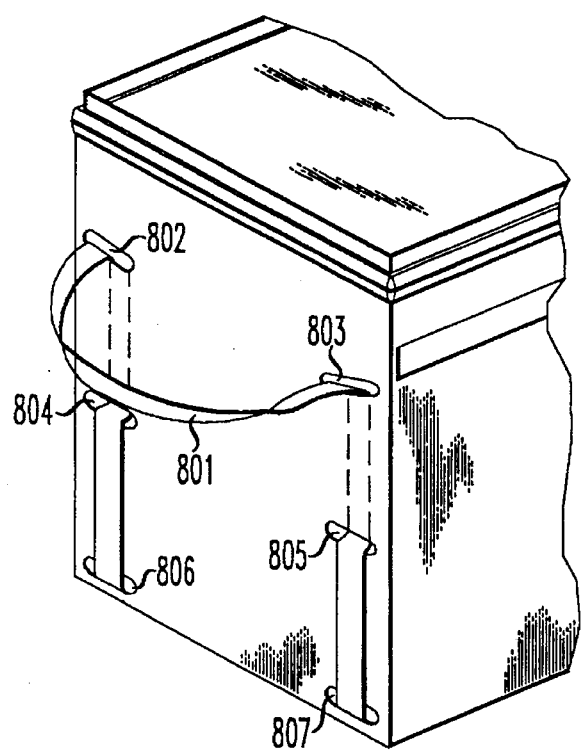
Figure 9:
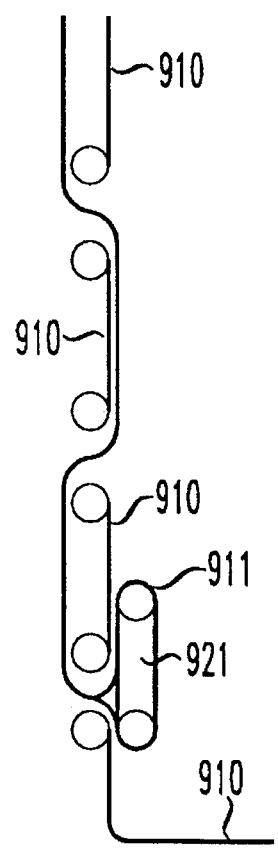
FIG. 9 is a cross section view of the attachment scheme of using a loop and block to secure the webbed ribbon to the support housing.
Figure 10:
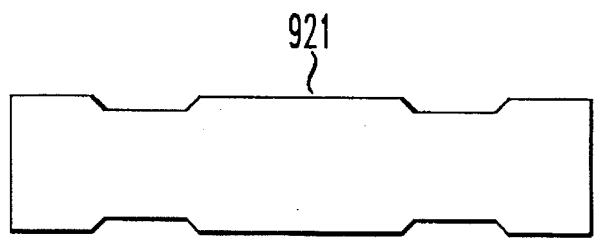
FIG. 10 is an elevation view the block used in the FIG. 9 arrangement.

In the handle structure of FIG. 8, the webbed band 802 is threaded through six slots 802 through 807 with the ribbon or band secured by a loop and retaining block combination unable to pass through by the slots 806 and 807. The locking or securing arrangement is shown in the cross section view in FIG. 9. The webbed band 901 is threaded through slots in the end wall 910 in the support housing. Each end of the band terminates in a sewn loop 911. This loop is collapsed and inserted through the slot and then expanded to accept the retaining block 921 which maintains a loop shape so that it cannot then pass through the slot thereby securing the webbed handle to the support housing. The block 921 shown in FIG. 10 is switched for this purpose.

Figure 11:
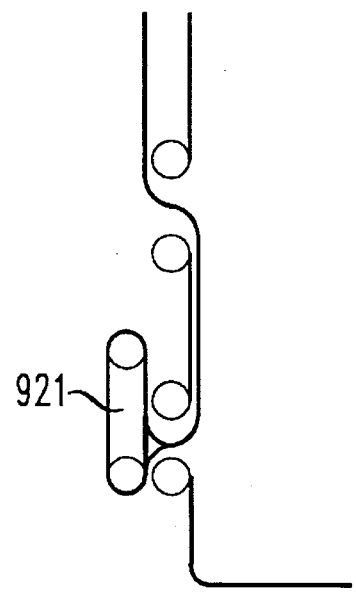
FIGS. 11 and 12 show alternate arrangements of the threading of the ribbon.
Figure 12:
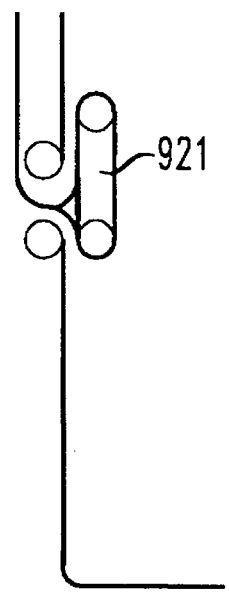

Alternative threading arrangements using the block 921 are shown in the FIGS. 11 and 12. The system of FIG. 11 uses two levels of slob where the system of FIG. 12 uses only the top slots such as in FIG. 6.

The invention claimed is:

1. A battery handle arrangement for lifting and transporting a battery contained in a battery housing surrounding its outer casing, comprising:

the battery housing having an outer hollow support housing including a hollow receptacle space with an internal boundary contour having a shape closely adhering to an external shape of the battery and covering four sides and a bottom of the battery;

a plurality of slots arranged in a first and second array located respectively at first and second opposing ends of the hollow support housing;

each array having a first and second slot at the top of the end with an oblong perimeter and each having a longitudinal axis at an angle with the horizontal;

threading a first and second ribbon through the slots of the first and second end respectively with the portion at the top being threaded through the first and second slot at the top to form a handle.

2. A battery handle arrangement for lifting and transporting a battery and having a batten container to support the battery, comprising:

the battery container including an outer hollow support housing having a hollow receptacle space with an internal boundary contour with a shape closely adhering to an external shape of the battery and covering four sides and a bottom of the battery;

a plurality of slots arranged in a first and second array located respectively at first and second opposing ends of the hollow support housing;

each array having a first and second slot at the top of the end each slot having an oblong perimeter with it's longitudinal axis at an angle with the horizontal;

a first and second ribbon or band of webbed material comprised of a Poly Phenylene Sulfide material;

threading the first and second ribbon through the slots of the first and second end respectively with the portion at the top being threaded through the first and second slot at the top to form a handle.

3. A battery handle arrangement for facilitating transport of a battery, comprising:

a battery support housing for covering four sides and a bottom of the battery;

a first and second array of paired slots located in opposing first and second sides of the battery support housing, a top pair of slots in each of the opposing first and second sides of the battery support housing each having an oblong perimeter and having a longitudinal axis at an angle with the horizontal;

a first and second narrow band of webbing each having a first and second end and each being continuously threaded through the paired slots in each of the opposing first and second sides, respectively; of the battery support housing;

the first and second narrow band of webbing each being threaded with slack in the webbing between two top paired slots in the first and second sides of the battery support housing to provide hand grips of the webbing;

the first and second ends of the first and second narrow band of webbing secured to the housing by circularly threading ends of the webbing through adjacent slots in each of the opposing sides of the housing by at least two turns.

4. A battery handle arrangement for lifting and transporting a battery, the battery being inserted into a battery container, comprising:

the battery container including a support container having a hollow receptacle space with an internal boundary having a shape for readily accepting an external shape of the battery;

at least a pair of slots in each of opposing ends of the battery housing and the pair of slots each having a circular shape;

threading independent first and second ribbon of webbed material through the pair of slots in opposing ends respectively and securing both ends of each ribbon within the hollow receptacle space independently at each opposing end.

5. A battery handle arrangement, as claimed in claim 4 wherein:

the securing of both ends is by sewing the ends together.

6. A battery handle arrangement, as claimed in claim 4, wherein:

the securing of both ends is by providing a loop at each of the both ends, inserting the loops into added provided slots and by inserting blocks into the loops to expand them to a dimension preventing passage of the loop through the slot.

7. A battery handle arrangement, as claimed in claim 4, wherein:

the pair of slots in each end is located near a top edge of the battery housing and each having an oblong shape with a longitudinal axis at the oblong perimeter at an angle with the horizontal.

8. A battery handle arrangement, as claimed in claim 4, wherein:

the securing of both ends is by ultrasonically welding the ends together.

9. A battery handle arrangement, as claimed in claim 4, wherein:

the band of webbed material is constructed of a herringbone weave of polypherylene sulfide material.

* * * * *